UNITED STATES PATENT OFFICE.

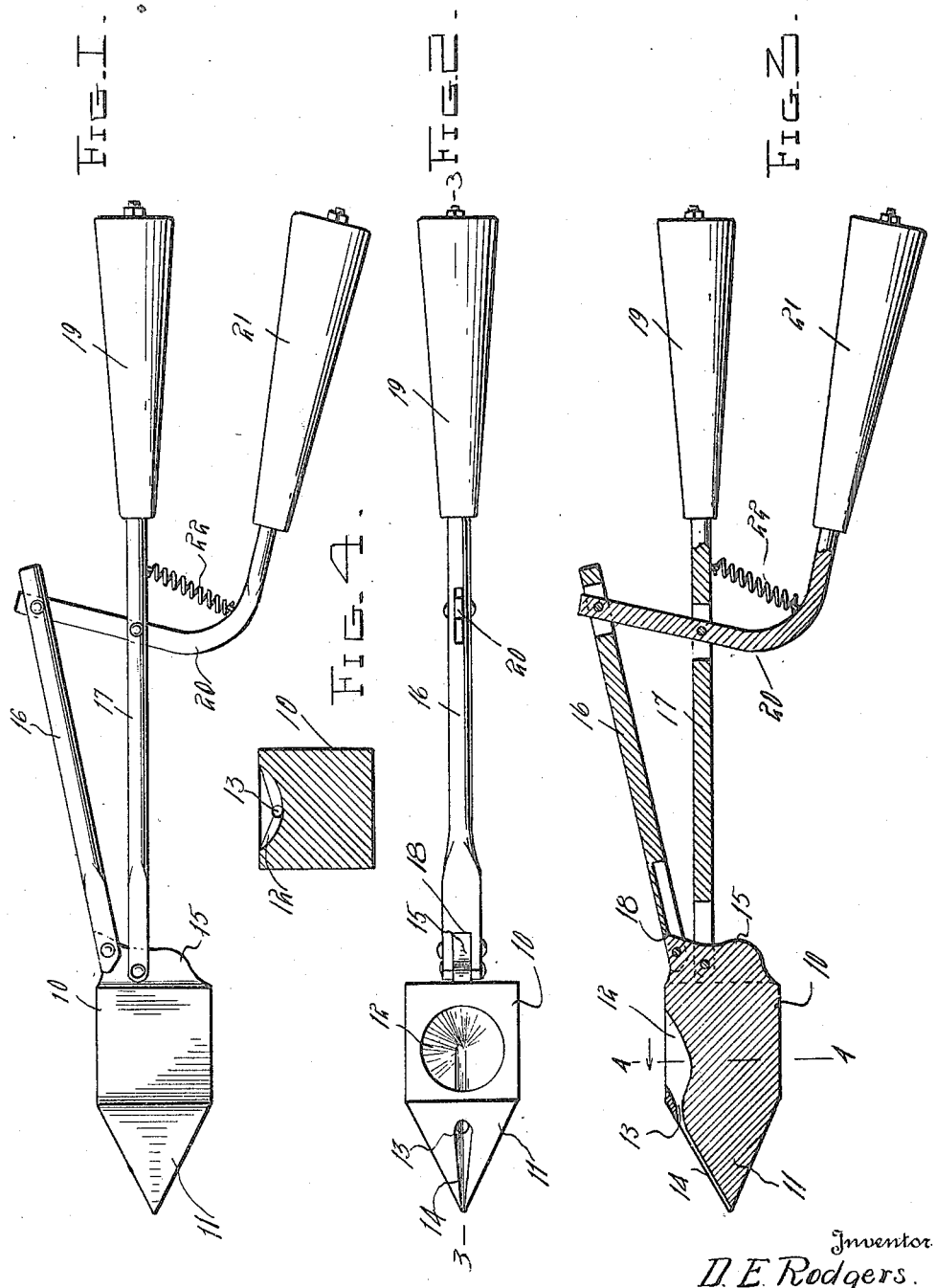

DON E. RODGERS, OF GORMAN, TEXAS.

SOLDERING-IRON.

1,135,050. Specification of Letters Patent. Patented Apr. 13, 1915.

Application filed August 19, 1913. Serial No. 785,528.

*To all whom it may concern:*

Be it known that I, DON E. RODGERS, a citizen of the United States, residing at Gorman, in the county of Eastland, State of Texas, have invented certain new and useful Improvements in Soldering-Irons; and I do hereby declare the following to be a full, clear, and exact description of the invention, such as will enable others skilled in the art to which it appertains to make and use the same.

This invention relates to improvements in soldering irons.

The principal object of the invention is to provide a soldering iron which is so formed as to feed a molten solder directly to the point of the iron and in a steady flowing stream.

Other objects and advantages will be apparent from the following description, when taken in connection with the accompanying drawings.

In the drawings: Figure 1 is a side elevation of a soldering iron made in accordance with my invention. Fig. 2 is a top plan view. Fig. 3 is a vertical longitudinal sectional view on the line 3—3 of Fig. 2. Fig. 4 is a vertical transverse sectional view on the line 4—4 of Fig. 3, looking in the direction of the arrows.

Referring particularly to the accompanying drawings, 10 represents the head of the soldering iron which is formed of any suitable material, as copper or brass, this head being formed with the smoothing and applying point 11. In the upper side of the head is formed a recess 12, in the forward wall of which is formed an opening 13 communicating with a channel 14 which extends down one face of the head and to the point. At the rear of the head is formed a rearwardly extending lug 15 to which are pivotally connected the shanks 16 and 17, the former of which is connected near the upper end of the lug. The portion of the lug which is straddled by the shank 16 is provided with a shoulder 18 which holds the head in proper position when pressure is brought to bear in the operation of the device. The shank 17 extends straight back from the head and is provided with a hand grip 19. The shank 16 is somewhat shorter than the shank 17 and has pivotally connected to its rear end, one end of one arm of a bent lever 20, this arm being also pivotally connected to the shank 17. The other arm of the lever carries a hand grip 21. Connected at one end to the shank 17 in rear of the pivot of the bent lever and at its other end to the bent lever is a spring 22 which is normally under compression to hold the hand grip in proper position so that the shanks 16 and 17 are operated to hold the head level.

In the use of the device the head is properly heated, and then solder is placed in the recess 12. The heat of the head causes the solder to melt, and on pressing the handles together, the head will be tipped by the shanks 16 and 17 so that the molten solder will pass through the opening 13 and run down the channel 14.

What is claimed is:

In a soldering iron, the combination with a head having a solder recess, a channel leading from the recess to the point of the head, a shank pivotally connected with the head and extending rearwardly therefrom, a link pivotally connected with the head and extending upwardly and rearwardly therefrom, a bent lever having one of its arms pivoted centrally on the intermediate portion of the first named shank, the pivoted arm of the bent lever being pivotally connected with the rear end of the said link, handle members carried by the rear end of the said shank, and the other arm of the bent lever end disposed in position to be grasped by the hand, and a spring between the shank and the bent lever for holding the handles separated and the head in alinement with the shank, whereby when the handles are moved toward each other, the bent lever and link will tilt the head so as to cause the solder to run from the recess through the channel.

In testimony whereof, I affix my signature, in the presence of two witnesses.

DON E. RODGERS.

Witnesses:
C. E. HERRINGTON,
T. M. NEILL.

Copies of this patent may be obtained for five cents each, by addressing the "Commissioner of Patents, Washington, D. C."